US009578445B2

(12) United States Patent
White et al.

(10) Patent No.: US 9,578,445 B2
(45) Date of Patent: Feb. 21, 2017

(54) SYSTEMS AND METHODS TO SYNCHRONIZE DATA TO A MOBILE DEVICE BASED ON A DEVICE USAGE CONTEXT

(71) Applicant: Optio Labs, Inc., Boston, MA (US)

(72) Inventors: Christopher Jules White, Nashville, TN (US); Brian Dougherty, Nashville, TN (US); Thomas Charles Clancy, III, Washington, DC (US); David Alexander Hamrick, Nashville, TN (US); Grayson Gates Sharpe, Louisville, KY (US); Robert Austin Hanlin, Nashville, TN (US); Krzysztof Kamil Zienkiewicz, Nashville, TN (US); Christopher Michael Thompson, Nashville, TN (US)

(73) Assignee: OPTIO LABS, INC., Boston, MA (US)

( * ) Notice: Subject to any disclaimer, the term of this patent is extended or adjusted under 35 U.S.C. 154(b) by 0 days.

(21) Appl. No.: 14/210,376

(22) Filed: Mar. 13, 2014

(65) Prior Publication Data

US 2014/0282857 A1 Sep. 18, 2014

Related U.S. Application Data

(60) Provisional application No. 61/790,728, filed on Mar. 15, 2013, provisional application No. 61/785,109, (Continued)

(51) Int. Cl.
*H04L 29/06* (2006.01)
*H04W 4/00* (2009.01)
(Continued)

(52) U.S. Cl.
CPC .............. *H04W 4/008* (2013.01); *G01S 5/00* (2013.01); *G01S 5/02* (2013.01); *G06F 21/44* (2013.01); *G06F 21/6218* (2013.01); *H04L 63/0428* (2013.01); *H04L 63/0853* (2013.01); *H04L 63/107* (2013.01); *H04L 63/20* (2013.01);
(Continued)

(58) Field of Classification Search
CPC combination set(s) only.
See application file for complete search history.

(56) References Cited

U.S. PATENT DOCUMENTS 6,317,868 B1 11/2001 Grimm et al.
6,467,086 B1 10/2002 Kiczales et al.
(Continued)

OTHER PUBLICATIONS

Bertino, E., et al., "Location-Based Access Control Systems for Mobile Users—Concepts and Research Directions," SPRINGL '11 ACM, Chicago, IL, Nov. 1, 2011 (pp. 49-52) (4 pages).
(Continued)

*Primary Examiner* — Mahfuzur Rahman
(74) *Attorney, Agent, or Firm* — Wilmer Cutler Pickering Hale and Dorr LLP (57) ABSTRACT

A method, system, and computer-readable medium for synchronizing policy data on a device based on device usage context. By synchronizing policy data on the device based on device usage context, security, bandwidth and energy efficiency concerns associated with the current data synchronization art by intelligently organizing and prioritizing the updating of policy data in compliance with policy data.

15 Claims, 3 Drawing Sheets

Related U.S. Application Data filed on Mar. 14, 2013, provisional application No. 61/781,252, filed on Mar. 14, 2013, provisional application No. 61/780,408, filed on Mar. 13, 2013, provisional application No. 61/779,931, filed on Mar. 13, 2013.

(51) Int. Cl.

| H04W 4/02 | (2009.01) |
|---|---|
| G06F 21/62 | (2013.01) |
| G01S 5/00 | (2006.01) |
| H04W 64/00 | (2009.01) |
| G06F 21/44 | (2013.01) |
| G01S 5/02 | (2010.01) |

(52) U.S. Cl.
CPC ............. *H04W 4/02* (2013.01); *H04W 64/00* (2013.01); *G06F 2221/2111* (2013.01); *Y02B 60/50* (2013.01)

(56) References Cited

U.S. PATENT DOCUMENTS

| 7,207,041 | B2 | 4/2007 | Elson et al. |
| 7,461,144 | B1 | 12/2008 | Beloussov et al. |
| 7,681,226 | B2 | 3/2010 | Kraemer et al. |
| 7,966,599 | B1 | 6/2011 | Malasky et al. |
| 8,099,596 | B1 | 1/2012 | Rusakov et al. |
| 8,225,329 | B1 | 7/2012 | Lynn |
| 8,387,048 | B1 | 2/2013 | Grechishkin et al. |
| 8,490,191 | B2 | 7/2013 | Kuegler et al. |
| 8,505,029 | B1 | 8/2013 | Chanda et al. |
| 8,516,095 | B2* | 8/2013 | Eisener ................... H04W 4/08 709/203 |
| 8,533,860 | B1 | 9/2013 | Grecia |
| 8,584,229 | B2 | 11/2013 | Brutch et al. |
| 8,595,832 | B1 | 11/2013 | Yee et al. |
| 8,613,052 | B2 | 12/2013 | Weiss |
| 8,655,307 | B1* | 2/2014 | Walker ............... H04W 52/0212 455/343.5 |
| 8,874,891 | B2 | 10/2014 | Gattegno |
| 8,887,308 | B2 | 11/2014 | Grecia |
| 9,191,382 | B1 | 11/2015 | Hornung et al. |
| 2002/0052965 | A1 | 5/2002 | Dowling |
| 2003/0115291 | A1 | 6/2003 | Kendall et al. |
| 2003/0140088 | A1* | 7/2003 | Robinson ............... G06Q 10/10 709/202 |
| 2003/0149874 | A1 | 8/2003 | Balfanz et al. |
| 2003/0194094 | A1 | 10/2003 | Lampson et al. |
| 2004/0199763 | A1 | 10/2004 | Freund |
| 2004/0255145 | A1 | 12/2004 | Chow |
| 2005/0060365 | A1* | 3/2005 | Robinson ............... H04L 69/329 709/203 |
| 2005/0071643 | A1 | 3/2005 | Moghe |
| 2005/0136845 | A1 | 6/2005 | Masuoka et al. |
| 2005/0138416 | A1 | 6/2005 | Qian et al. |
| 2005/0240396 | A1 | 10/2005 | Childs et al. |
| 2005/0240985 | A1 | 10/2005 | Alkove et al. |
| 2005/0246453 | A1 | 11/2005 | Erlingsson et al. |
| 2005/0246522 | A1 | 11/2005 | Samuelsson et al. |
| 2005/0246718 | A1 | 11/2005 | Erlingsson et al. |
| 2006/0048226 | A1 | 3/2006 | Rits et al. |
| 2006/0092037 | A1 | 5/2006 | Neogi et al. |
| 2006/0224742 | A1* | 10/2006 | Shahbazi ................ H04L 63/20 709/226 |
| 2007/0088792 | A1 | 4/2007 | Piper et al. |
| 2007/0186274 | A1 | 8/2007 | Thrysoe et al. |
| 2007/0271594 | A1 | 11/2007 | Wobber et al. |
| 2008/0115011 | A1 | 5/2008 | Codrescu et al. |
| 2008/0126800 | A1 | 5/2008 | Guo et al. |
| 2008/0134347 | A1 | 6/2008 | Goyal et al. |
| 2008/0235587 | A1 | 9/2008 | Heie et al. |
| 2008/0278408 | A1 | 11/2008 | Strickland et al. |
| 2009/0025011 | A1 | 1/2009 | Neil et al. |
| 2009/0030974 | A1* | 1/2009 | Boudreau ............ H04L 63/104 709/203 |
| 2009/0138547 | A1* | 5/2009 | Boudreau ............... H04W 4/08 709/203 |
| 2009/0204815 | A1 | 8/2009 | Dennis et al. |
| 2009/0282477 | A1 | 11/2009 | Chen et al. |
| 2009/0319782 | A1 | 12/2009 | Lee |
| 2010/0023582 | A1 | 1/2010 | Pedersen et al. |
| 2010/0031252 | A1 | 2/2010 | Horwitz |
| 2010/0031325 | A1 | 2/2010 | Maigne et al. |
| 2010/0037311 | A1* | 2/2010 | He ..................... H04L 63/0209 726/15 |
| 2010/0121567 | A1 | 5/2010 | Mendelson |
| 2010/0121597 | A1 | 5/2010 | Steffens et al. |
| 2010/0153697 | A1 | 6/2010 | Ford et al. |
| 2010/0306759 | A1 | 12/2010 | Kohler et al. |
| 2011/0055890 | A1 | 3/2011 | Gaulin et al. |
| 2011/0067107 | A1 | 3/2011 | Weeks et al. |
| 2011/0151955 | A1 | 6/2011 | Nave |
| 2011/0197201 | A1 | 8/2011 | Yoo et al. |
| 2011/0225624 | A1 | 9/2011 | Sawhney et al. |
| 2012/0033678 | A1 | 2/2012 | Page et al. |
| 2012/0084381 | A1 | 4/2012 | Alladi et al. |
| 2012/0084792 | A1 | 4/2012 | Benedek et al. |
| 2012/0116602 | A1 | 5/2012 | Vaswani et al. |
| 2012/0129503 | A1 | 5/2012 | Lindeman et al. |
| 2012/0191677 | A1 | 7/2012 | Lim |
| 2012/0197988 | A1* | 8/2012 | Leppanen ............. G06Q 50/01 709/204 |
| 2012/0210417 | A1 | 8/2012 | Shieh |
| 2012/0215637 | A1 | 8/2012 | Hermann |
| 2012/0254602 | A1 | 10/2012 | Bhansali et al. |
| 2012/0255014 | A1 | 10/2012 | Sallam |
| 2012/0258730 | A1 | 10/2012 | Tinnakornsrisuphap et al. |
| 2012/0304310 | A1 | 11/2012 | Blaisdell |
| 2013/0007873 | A1 | 1/2013 | Prakash et al. |
| 2013/0054812 | A1 | 2/2013 | DeCoteau |
| 2013/0067488 | A1 | 3/2013 | Kumar et al. |
| 2013/0083722 | A1 | 4/2013 | Bhargava et al. |
| 2013/0086202 | A1 | 4/2013 | Connelly et al. |
| 2013/0091543 | A1 | 4/2013 | Wade et al. |
| 2013/0111039 | A1 | 5/2013 | Gomes |
| 2013/0124840 | A1 | 5/2013 | Diluoffo et al. |
| 2013/0145362 | A1 | 6/2013 | Dawson et al. |
| 2013/0179991 | A1 | 7/2013 | White et al. |
| 2013/0227641 | A1 | 8/2013 | White et al. |
| 2013/0232573 | A1 | 9/2013 | Saidi et al. |
| 2013/0268997 | A1 | 10/2013 | Clancy, III et al. |
| 2013/0291056 | A1 | 10/2013 | Gaudet et al. |
| 2013/0312058 | A1 | 11/2013 | Thompson et al. |
| 2014/0059357 | A1 | 2/2014 | Andersson et al. |
| 2014/0075451 | A1 | 3/2014 | Anderson et al. |
| 2014/0201807 | A1 | 7/2014 | White et al. |
| 2014/0256251 | A1 | 9/2014 | Caceres et al. |
| 2014/0273857 | A1 | 9/2014 | White et al. |
| 2014/0282992 | A1 | 9/2014 | Clancy, III et al. |
| 2014/0283136 | A1 | 9/2014 | Dougherty et al. |

OTHER PUBLICATIONS

Cogen, D. "Android 101: Rooting, Jailbreaking, and Unlocking," http://theunlockr.com/2010/08/27/android-101-rooting-jailbreaking-and-unlocking Accessed Dec. 15, 2014 (8 pages).

Extended European Search Report issued by the European Patent Office for European Patent Application No. 13733798.6 dated May 6, 2015 (6 pages).

Fenzi, K. "Tuning Your SELinux Policy with Audit2allow," http://collaboration.cmc.ec.gc.ca/science/rpn/biblio/ddj/Website/articles/SA/v14/i08/a1.htm Accessed Dec. 15, 2014 (6 pages).

Garfinkel, T. "Traps and Pitfalls: Practical Problems in System Call Interposition Based Security Tools," The 10th Annual Network and Distributed System Security Symposium, Feb. 2003 (14 pages).

International Search Report and Written Opinion issued by the U.S. Patent and Trademark Office as International Searching Authority for International Application No. PCT/US14/47826 dated Apr. 1, 2015 (8 pages).

(56) References Cited

OTHER PUBLICATIONS

International Search Report and Written Opinion issued by the United States Patent and Trademark Office as International Searching Authority for International Application No. PCT/US2015/020492 mailed Jun. 25, 2015 (7 pages).
International Search Report and Written Opinion issued by the United States Patent Office as International Searching Authority for Application No. PCT/US14/33344 mailed on Sep. 11, 2014 (12 pages).
Kotrappa, S., et al., "Multilevel Security Using Aspect Oriented Programming AspectJ," 2010 International Conference on Advances in Recent Technologies in Communication and Computing, IEEE Computer Society, No Month 2010, (pp. 369-373) (5 pages).
Schreiber, T. "Android Binder: Android Interprocess Communication," Ruhr-Universitat Bochum, Seminarthesis Oct. 5, 2011 (34 pages).
Shimko, S., et al., "Securing Inter-process Communications in SELinux," Tresys Technology, LLC, Mar. 12, 2007 (10 pages).

\* cited by examiner

SYSTEMS AND METHODS TO SYNCHRONIZE DATA TO A MOBILE DEVICE BASED ON A DEVICE USAGE CONTEXT

CROSS-REFERENCE TO RELATED APPLICATIONS

Some of the aspects of the methods and systems described herein have been described in U.S. Provisional Application Nos. 61/780,408 entitled "Systems And Methods To Synchronize Data To A Mobile Device Based On A Device Usage Context", filed Mar. 13, 2013; 61/781,252 entitled "Systems And Methods To Secure Short-Range Proximity Signals", filed Mar. 14, 2013; 61/785,109 entitled "Systems And Methods For Securing And Locating Computing Devices", filed Mar. 14, 2013; 61/779,931 entitled "Systems And Methods For Securing The Boot Process Of A Device Using Credentials Stored On An Authentication Token", filed Mar. 13, 2013; 61/790,728 entitled "Systems And Methods For Enforcing Security In Mobile Computing", filed Mar. 15, 2013; and U.S. Non-Provisional application Ser. No. 13/735,885 entitled "Systems and Methods for Enforcing Security in Mobile Computing", filed Jan. 7, 2013, each of which is hereby incorporated by reference herein in its entirety.

BACKGROUND OF THE INVENTION

The present invention is in the technical field of communications security. More particularly, the present invention is in the technical field of policy enforcement related to administrative access in mobile communications devices in a manner that, among other things, provides significant improvements in energy efficiency.

SUMMARY OF THE INVENTION

The present invention includes a method for synchronizing data to a mobile device based on device usage context.

Modern mobile devices often store data that is synchronized with a remote system, such as a server. Because of its finite resources compared to the remote system, usually only a partial image of the data stored on the remote system is replicated on the mobile device. This is often accomplished by passing incremental updates between the two systems. For example, a user's email inbox, sent folder and other saved folders may be all be stored on a remote email server, and only the most recent 25 emails in the inbox may be stored on the user's mobile device. The emails residing on the mobile device may be updated as the user drafts additional emails from the device or as new emails received at the mail server are pushed to the mobile device. Changes made at the mobile device may be recorded at the mail server as the user, for example, sends emails via the mail server.

In many modern devices, a polling-based communication approach is used to synchronize data between the device and the server. In a polling approach, the device periodically initiates communication with the server when it determines that data needs to be synchronized. For example, data can be synchronized by polling using the hyper-text transfer protocol where the device periodically issues a hyper-text transfer protocol request to receive data from the server via a hyper-text transfer protocol response. A problem with common polling approaches is that they used fixed intervals or rely on indications sent from the server and may not be resource efficient. The present invention uses a device context that indicates the cyber or physical state of the device to determine the most appropriate times to poll the server and synchronize data. The cyber state can be any software associated state or event, such as specific data in memory. The physical state can be elements regarding the physical world surrounding the device or hardware elements on the device, such as wireless signals in proximity to the device.

The present invention may address security, bandwidth and energy efficiency concerns associated with the current art for synchronizing data on mobile device by intelligently organizing and prioritizing the synchronization of higher priority data. In a system where data is synchronized between two computing systems, such as a server and a mobile device, it may be more secure and more efficient (both with respect to bandwidth and energy usage) to only synchronize said data when it will be of use to one of the computing systems. For example, when synchronizing data to a mobile device from a central server, the mobile device only needs the data when the user is actively using the data or when the data will be immediately usable, not when the mobile device is sitting idle.

These security and efficiency concerns may be addressed by defining multiple classes of data with different synchronization priorities, by defining and monitoring the device's context (e.g. whether the device is idle, whether the user is attempting to unlock the device, whether the user is starting the email client, etc.) and synchronizing one or more classes of data based on the existing classes and the system context.

The present invention may benefit applications, including but not limited to, communications applications, such as enhanced features of chat, sharing, social networking, contact management, messaging, email, web browsing and the like; games and entertainment content applications (video games, music, video content, online content, etc.); command and control applications and features (operating system control, phone control, restricted/secured data access control, etc.); enterprise IT management applications, such as device imaging and device wiping; automotive applications, such as navigation, driver support and safety systems; and advanced security tools, such as anti-virus, firmware integrity, operating system integrity, boot loader integrity, firewalls, intrusion detection systems, and intrusion prevention systems, and the like.

DETAILED DESCRIPTION

Figure 1:
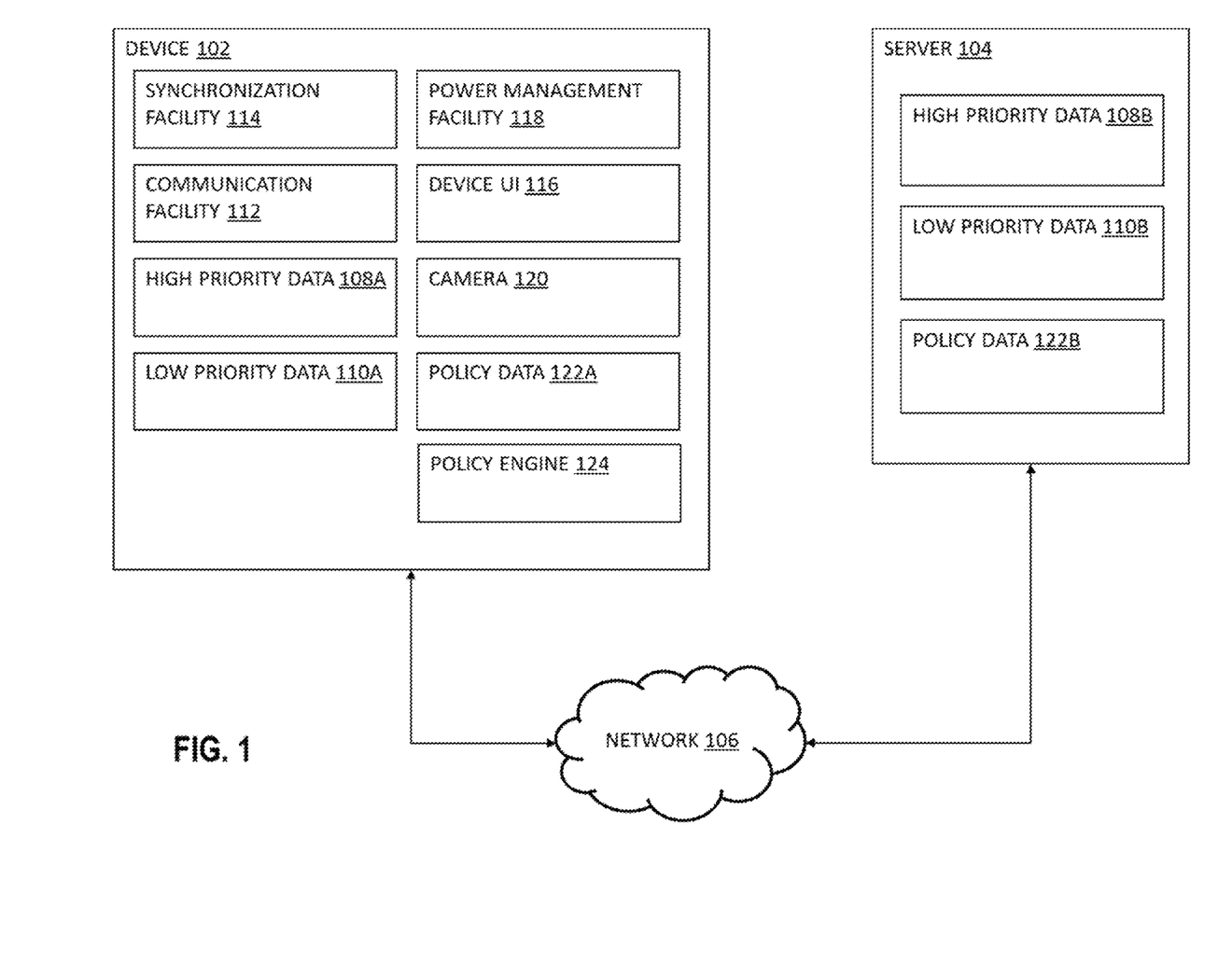
FIG. 1 provides a schematic view of components of a system for synchronization as described in certain preferred embodiments.

Referring to the invention in FIG. 1, a device 102 may include one or more of a processor 103, a memory 105, a communication facility 112, and a synchronization facility 114. Communication facility 112 may provide an input and/or output mechanism to communicate with other network devices such as router 105 or server 104. The communication facility 112 may also provide communication with, for example, other gateways 109, wireless access nodes 111, and application servers 113 to send and receive data such as packets and messages. The communication facility 112 may provide connectivity to 3G, 4G, WiFi, or other network types. Processor 103 runs software which uses the communication facility 112 and the memory 105. Memory 105 comprises storage media such as a tangible, non-transitory computer readable medium, a programmable read only memory (PROM), or flash memory. Processor 103 may be any computer chip that is capable of executing program instruction streams that are part of a software program. Processor 103 may have multiple cores for executing multiple streams of program instructions simultaneously. The processor 103 may also have multiple sub-processors which are optimized for executing particular categories of program instructions and are controlled by the processor. The memory 105 is capable of storing and retrieving program instructions, program data, or any other data that is used by the processor. The processor 103 may store and retrieve data from the memory as a software program is executed. Memory 105 may include or store the synchronization facility 114. Memory 105 may also include associated polies and configurations. The processor may access and update the synchronization facility 114 and associated policies and configurations. Synchronization facility 114 may communicate, through communication facility 112, to a server 104 via a network 106, to synchronize data 108A, 110A, 122A on the device 102 with data 108B, 110B, 122B on the server 104. In some embodiments, the data may be separated into a plurality of classes, such as high priority data 108 A and B and low priority data 110 A and B. The synchronization facility 114 may initiate data synchronization of one or more classes of data based upon an input, such as a change of state from one or more resources on the device 102. For example, the synchronization facility 114 may initiate data synchronization of the high priority data based upon an input from the power management facility 118 indicating that the device 102 is being powered on. In another example, the synchronization facility 114 may initiate data synchronization of the low priority data based upon an input from the device user interface (UI) 116 indicating that the user of the device 102 has started an application that utilizes the low priority data. In still another example, the synchronization facility 114 may initiate data synchronization of policy data 122 for use by a policy engine 124.

A trusted code zone 126 may exist on the system as a zone of processor 103. One or more encryption elements 128 may be are placed within the trusted code zone 126. A trusted code zone of a processor may ensure through a cryptographic chain of trust that code executing within it has not been tampered with. Once an element is placed within the trusted processor zone for execution, the output from operations performed on it may be considered tamper-free, correct, and trusted. An example of commercial software providing trusted zone functionality is TRUSTZONE by ARM Limited. The one or more encryption elements 128 may be used to perform cryptographic operations to improve the security of the device 102. For example, the encryption element 128 may encrypt some or all of the device's communications over communication facility 112.

The trusted code zone 126 may also include an encryption element 128 or verification element 130 that is used to securely validate one or more elements of the context or context determination. The trusted code zone 126 protects the integrity of the encryption element 128 or verification element 130 to ensure that the context is correctly determined and/or that any communication between the device and the server is properly encrypted and/or authenticated.

In other embodiments, an external security device 132 may be used to verify elements of the context and/or encryption or authentication of the synchronization process with the server. The external security device may be a smartcard reader, such as a Bluetooth enabled reader of a government common authentication card. The external security device may also be a sleeve that is attached to the device and plugged into one or more ports on the device, such as the universal serial bus port. The external security device may also be used to verify the integrity or authenticity of data received from the server. The external security device may also be used to decrypt data received from the server. The external security device may be used instead of or in combination with the encryption element 128 and verification element 130 to perform verification, authentication, and encryption functions. For example, the external security device may encrypt a request to the server, authenticate the device or request to the server, authenticate the server or response to the device, verify the integrity and/or origin of the data received from the server, or verify the context of the device.

The device (e.g., mobile device, handheld device, laptop, or other computing device) described above can be a smart phone offering advanced capabilities including, but not limited to word processing, web browsing, gaming, e-book capabilities, an operating system, a user interface, and a full keyboard. The device may run an operating system such as SYMBIAN OS, APPLE IOS, RIM'S BLACKBERRY, WINDOWS MOBILE, Linux, PALM WEBOS, and ANDROID. The screen may be a touch screen that can be used to input data to the mobile device and the screen can be used instead of a full keyboard. The device may have the capability to run applications or communicate with applications that are provided by other network devices. The device can receive updates and other information from these applications via the communication facility.

Figure 2:
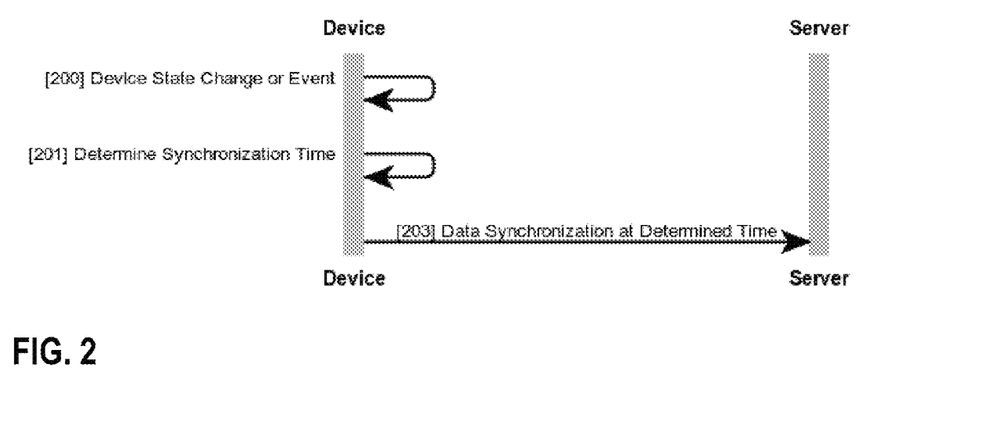
FIG. 2 illustrates one method of synchronizing data between a device and a server.

We now describe some embodiments of a method of adaptive synchronization that may include adapting a synchronization facility 114 on a device 102 to determine when to synchronize a plurality of classes of data 108 A and B, 110 A and B, 122 A and B with data on a server 104. FIG. 2 displays one such embodiment. At step 200, a device context is determined based on a device state or event. At step 201, a time is determined to synchronize data with the server based on the device context. At step 203, data is synchronized with the server at the determined time. Further details of the operation of at least some embodiments of the invention are discussed below. In a system where data is synchronized between two computing systems, such as a server 104 and a device 102, it may be advantageous to only synchronize said data when it will be of use to one of the computing systems. For example, when synchronizing data to a mobile device from a central server, the device may only need the data when the device user is actively using the data or when the data will be immediately usable, not when the mobile device is sitting idle. Alternately, it may be advantageous to synchronize certain data when the user stops using the mobile device so that the data will be present when the device user next begins to actively use the device. It is also advantageous to adjust the data synchronization process based on current usage state because it may allow the device to realize the full power consumption benefits in low-power states, such as when the device display is turned off, and perform more power-intensive tasks, such as network operations, when the device is in already in use.

The context determination may be used to aid in identifying an appropriate time to synchronize a device with data on a server in order to ensure that the data is up to date immediately before a user begins using the device. For example, the cyber context may be determined from one or more events indicating that the lock screen of the device is being unlocked, indicating that the user is about to begin using the device and its data should be synchronized with the server. In another embodiment, the launch of an application, such as a sensitive corporate application, may indicate that the user is about to begin using it and that the device should synchronize data specifying allowed usage of that application. In another embodiment, the device context may indicate that the device is being turned on and that the device should synchronize data before the user begins using the device. In another embodiment, the context may be the connection or disconnection from a network, indicating that data related to the network is or is not needed.

In some embodiments, a device context is determined in order to synchronize data at an advantageous time. In at least some embodiments, the context may be determined based on a device state. In some embodiments, the context may be determined based on a device event.

In at least some embodiments, the device event is an event that is related to a cyber-state of the device. Such events may include the device being locked or unlocked, the device screen turning on or off, an application launching on the device, the device connecting to or disconnecting from a network or from a specific network, or a financial transaction being in progress. For example, the device might determine the device context when the device is unlocked in order to synchronize data when a user begins engaging in use of the device. Device context can also be determined based on combinations of such events or the states the events are related to. For example, the device context might be determined when the device is unlocked while connected to a specific network. In that circumstance, synchronization might be triggered. As an example of the advantages of such a circumstance, synchronization of confidential information could be limited to when the device is connected to a secure network. Synchronization might also be triggered when the device disconnects from the secure network in order to remove the confidential data from the device when the device is not connected to the secure network.

In at least some embodiments, the device state is a physical state of the device. Such states may include the current velocity or speed of the device, the location of the device within a building as determined by an indoor navigation or trilateration system, or the presence or absence of short range data signals (e.g., BLUETOOTH, BLUETOOTH LOW ENERGY BEACON, or Near Field Communication Tag signals) in the environment around the device. For example, the location of the device within a building as determined by an indoor navigation system, consisting of proximity signaling beacons, such as Bluetooth Low Energy Beacons, may indicate that the device needs to synchronize information relevant to policies for using computing resources within that physical location. Alternately, the device might determine the device context when the device is located near a point of interest in a building. In that circumstance, synchronization of data related to the point of interest might be triggered. As an example of the advantages of such a circumstance, a user might receive information about the point of interest without having to wait for such information to be transferred to their device. In another example, the physical context may indicate the speed or velocity of the device and the device may need to synchronize data regarding the policies regarding sending text messages while in motion. The physical context may also include a quick response code or near field communication tag indicating a tagged object, such as a product, that related information should be synchronized for between the device and server. Device context can also be determined based on combinations of physical states. For example, synchronization might be triggered when the device is located near a point of interest and the current speed of the device is near zero. This is further advantageous because information is only transferred when a user is dwelling near a point of interest, minimizing data transfers when a user simply passes by a point of interest.

The physical context in place of or in addition to the cyber context can be used to determine when to poll the server. Device contexts can also be determined based on various combinations of one or more of device cyber-states, device physical states, device events related to device cyber-states, device events related to device physical states. While the above embodiments are described in relation to immediately triggering synchronization, synchronization may also be triggered at a delayed interval or canceled based on the device context. Further, an already scheduled synchronization may have its scheduled time accelerated or decelerated based on the device context. In other embodiments, other changes to synchronization patterns may also occur in response to the determination of a device context.

Once a synchronization has been scheduled or triggered, the synchronization proceeds at the time determined by the device context. Other aspects of the synchronization may also be affected by the device context. For example, in addition to determining when to synchronize data, the context may also be used to aid in determining what data to synchronize with the device. For example, the context may indicate that data relevant to a specific physical location needs to be synchronized with the device.

The device context can thus help to selectively determine what data should be synchronized or what types of data should be synchronized. In some embodiments, the device context can trigger synchronization of high priority data. In other embodiments, the device context can bar synchronization of high priority data. As an example of the advantages of such features, device context could trigger or bar the synchronization of confidential data when a user is on a secure network or not on a secure network.

In one embodiment, a user interaction with the device 102 may initiate a synchronization event. The user interaction with the device 102 may be, for example, an input to the device UI 116. The input to the device UI 116 may one or more of locking the device 102, unlocking the device 102, starting an application, stopping an application, using an application, booting the device 102, shutting down the device 102, sending information to a remote computer, requesting information from a remote computer, or some other input, and the like. The synchronization event may be syncing files, syncing contacts, syncing mail, syncing encryption keys, syncing financial data, or other synchronizations.

In other embodiments, the synchronization event may be initiated by the device 102 or software executing on the device 102. For example, the power management facility 118 may initiate a synchronization event when the device 102 battery reaches a certain charge.

In one example, the user may provide an input to the device UI 116 to lock the screen, and, based on that input, the synchronization facility 114 may indicate determine the device's state (i.e. the user is not intending to use the device for a period of time) and, based on the state, begin synchronizing data on the device. As a result, the device synchronizes data when the network connection is likely to be unoccupied and synchronization data does not compete for bandwidth with user data when the user is using the device.

In some embodiments, multiple classes of data are defined for synchronization between the computing systems. One class may be low priority data 110 A and B. In some embodiments, the low priority data 110 A and B may be synchronized only when the device is active. Types of data that may be in the class of low priority data may include, for example, personal emails, tweets, contact information, music files, and image files.

Another class of data may be high priority data 108 A and B. In some embodiments, the high priority data may be synchronized regardless of the current usage state of the device. Types of data that may be in the class of high priority data may include, for example, confidential business emails, text messages, voicemail notifications, instructions to wipe data on the device, and classified data. In some embodiments, there may be additional classes of data, such as medium priority data, medium-low priority data, highest priority data, and other classes of data. These classes of data may include, for example, (insert list of types of data).

In embodiments, the data being synchronized may be policy data 122 for a policy engine 124, which may use the policy data 122 to control aspects or features of the device 102. The policy engine 124 may generate a device-specific context, which may include one or more of the current date and time, the device location, the identity of the device user, and other context-related data. In some embodiments, the policy engine may be connected to a server 104, such as a policy server, which may push one or more policies as policy data 122 to the policy engine 124.

The policy engine 124 may be used to enforce one or more security policies on the device 102. In some embodiments, the policy data 122 may include a policy for the policy engine 124 to cause the device 102 to disable functionality. For example, the policy may include a rule for disabling the camera 120 when the policy engine 124 determines that the device 102 is located in a building that prohibits the use of cameras, like a research lab. In other embodiments, the policy data 122 may include a policy for the policy engine 124 to cause the device 102 to perform operations like erasing the stored content on the device 102. For example, the policy may include a rule for wiping all memory on the device 102 when the device user is not an authorized user or in response to an instruction from an authorized user who lost the device 102. In embodiments, a policy that disables the camera 120, for instance, may need only be synchronized when the device 102 is in a high-power state, as the camera 120 cannot be used in a low-power state regardless. However, in the case of a stolen or compromised device 102, it would be necessary to erase any sensitive data stored on the device 102 immediately rather than when the device 102 is going to be interacted with.

In another embodiment, the data synchronization strategy could depend on the context of the receiving computing system. For example, the synchronization facility 114 may initiate data synchronization when events occur on the device 102 such as, when an application is started or stopped. In the policy synchronization example, a synchronization of policies between the computing systems may be triggered when an untrusted application is launched on the device 102. In embodiments, data may be synchronized between a device and a server based on the power usage state of the device and/or based on other considerations. In embodiments, synchronization may be based on various considerations described herein separately or together.

The synchronization system could be made more or less complicated by adjusting the synchronization conditions. For example, the synchronization facility 114 may only use the network 106 while the device 102 is active and the network 106 connection is idle. In another example, the synchronization facility 114 may only use the network 106 while the device 102 is active and in a particular geo-location. In still another example, the synchronization facility 114 may only use the network 106 while the device 102 is active and the user has permitted synchronization.

In some embodiments, the data synchronized with the device may be financial data, such as a credit card number that is needed to purchase an item in the current context. The context may be, but is not limited to, a retail business, a bank, or a financial trading floor. The device may synchronize a preferred credit card processor, pin code, or other information to complete transactions in the context. The device may synchronize data related to transactions or trades currently occurring in a trading context. The synchronization of financial data ensures that financial transactions can be completed in a timely matter by having as much data needed to complete the transaction as possible already stored on the device.

Figure 3:
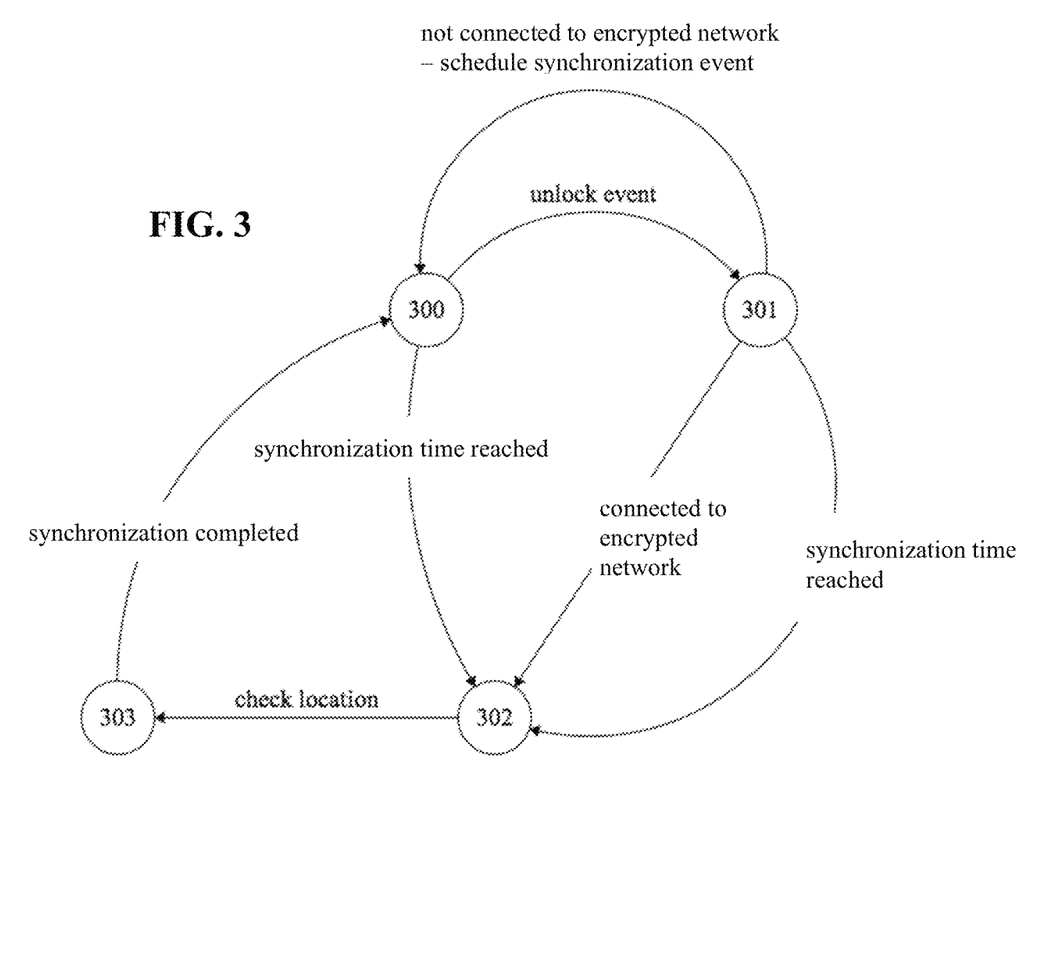
FIG. 3 illustrates the process of one embodiment of the invention.

In an example embodiment, the method is performed according to the algorithm shown in FIG. 3. In state 300, the device checks whether an unlocking event has been detected or a synchronization time has been reached. If an unlocking event has not been detected and a synchronization time has not been reached, the device remains in state 300. If an unlocking event has been detected, the device proceeds to state 301 where it determines a time for synchronization. If a synchronization time has been reached, the device proceeds to state 302. In state 301, the device determines the additional device context of whether the user is connected to an encrypted network. If it is, synchronization is scheduled to occur immediately and the device proceeds to state 302; otherwise, synchronization is scheduled to occur later and the device returns to state 300. In state 302, a synchronization type is determined according to a device context. In state 302 of this embodiment, the device checks whether the device is located within a retail bank associated with the user. If the device is located within a retail bank associated with the user, then synchronization data includes transaction data. If the device is not located within a retail bank associated with the user, then synchronization data does not include transaction data. In either case, the device proceeds to state 303. In state 303, the device performs synchronization.

One possible device state or event suitable for use in determining a device context is a determination that a user is authorized according to the invention of U.S. Provisional Patent Application No. 61/779,931. Another possible device state or event suitable for use in determining a device context is the location-based authorization described in the invention of U.S. Provisional Patent Application No. 61/785,109. Reading of the authentication token and credential processing may be performed in a trusted zone of a processor in some embodiments in accordance with the invention of U.S. Provisional Patent Application No. 61/790,728. Inter-process communications triggered by the invention of U.S. Provisional Patent Application No. 61/781,252 may also be suitable for use in determining a device context.

While the foregoing written description of the invention describes a method of implementing the invention, those of ordinary skill will understand and appreciate that it could equally be implemented by an apparatus containing some or all of the components shown in FIG. 1, by a non-transitory computer readable medium executed on a processor to perform the steps described, or other implementations within the scope and spirit of the invention. Further, while the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A method for selectively synchronizing data to a device by polling a server, comprising:
    applying initial policy data to the device via a policy engine;
    determining applicable device contexts based on the policy data;
    detecting the presence of an applicable device context based on at least one of a device state or event;
    determining a time to synchronize policy data with the server based on the detected device context;
    synchronizing policy data with the server at the determined time to generate updated policy data, wherein one or more aspects of synchronizing the policy data is secured via an external security module connected to the device, and wherein securing the one or more aspects of synchronizing the policy data comprises one or more of encrypting a request to the server, authenticating the device to the server, authenticating the server to the device, verifying the integrity of data received from the server, or verifying the context of the device;
    applying updated policy data to the device via the policy engine; and
    determining updated applicable device contexts based on the updated policy data,
    wherein communications with the server are encrypted by an encryption element within a trusted code zone of the device, and one or more aspects of the device context are verified by a verification element within the trusted code zone of the device.

2. The method of claim 1, wherein the device event is an event regarding the cyber-state of the device.

3. The method of claim 2, wherein the device event comprises at least one of device locking, device unlocking, the screen of the device turning on, the screen of the device turning off, the launch of an application, the connection to a specific network, or the disconnection from a specific network.

4. The method of claim 1, wherein the device state is a physical state of the device.

5. The method of claim 4, wherein the physical state comprises at least one of the location of the device within a building as determined by an indoor navigation system, the current velocity or speed of the device, or the presence or absence of short range data signals in a device environment.

6. The method of claim 1, wherein the device context is determined based on the device state and a GPS coordinate of the device.

7. The method of claim 1, wherein determining a time comprises accelerating synchronization with the server already scheduled to occur.

8. The method of claim 1, wherein the device context is determined by an external short range signal.

9. The method of claim 1, further comprising determining what data to selectively synchronize with the server based on the device context.

10. The method of claim 1, wherein the device context includes information on an in-process financial transaction and the data synchronized with the server includes one or more pieces of information relevant to the financial transaction.

11. A non-transitory computer-readable storage medium comprising: instructions executable by one or more processors to cause the one or more processors to:
    apply initial policy data to a device via a policy engine;
    determine applicable device contexts based on the policy data;
    detect the presence of an applicable device context based on at least one of a device state or event;
    determine a time to synchronize policy data with a server based on the detected device context;
    synchronize policy data with the server at the determined time to generate updated policy data, wherein one or more aspects of synchronizing the policy data is secured via an external security module connected to the device, and wherein securing the one or more aspects of synchronizing the policy data comprises one or more of encrypting a request to the server, authenticating the device to the server, authenticating the server to the device, verifying the integrity of data received from the server, or verifying the context of the device;
    apply updated policy data to the device via the policy engine; and
    determine updated applicable device contexts based on the updated policy data, wherein communications with the server are encrypted by an encryption element within a trusted code zone of the device, and one or more aspects of the device context are verified by a verification element within the trusted code zone of the device.

12. The non-transitory computer-readable storage medium of claim 11, wherein the device event comprises at least one of device locking, device unlocking, the screen of the device turning on, the screen of the device turning off, the launch of an application, the connection to a specific network, or the disconnection from a specific network.

13. The non-transitory computer-readable storage medium of claim 11, wherein the device state comprises at least one of the location of the device within a building as determined by an indoor navigation system, the current velocity or speed of the device, or the presence or absence of short range data signals in a device environment.

14. A system for accessing a file system, comprising: one or more hardware processors communicatively coupled to a file system, wherein the hardware processors are additionally communicatively coupled to a server via a network, wherein the one or more hardware processors are configured to:
    apply initial policy data to a device via a policy engine;
    determine applicable device contexts based on the policy data;
    detect the presence of an applicable device context based on at least one of a device state or event;
    determine a time to synchronize policy data with the server based on the detected device context;
    synchronize policy data with the server at the determined time to generate updated policy data, wherein one or more aspects of synchronizing the policy data is secured via an external security module connected to the device, and wherein securing the one or more aspects of synchronizing the policy data comprises one or more of encrypting a request to the server, authenticating the device to the server, authenticating the server to the device, verifying the integrity of data received from the server, or verifying the context of the device;

apply updated policy data to the device via the policy engine; and determine updated applicable device contexts based on the updated policy data, wherein communications with the server are encrypted by an encryption element within a trusted code zone of the device, and one or more aspects of the device context are verified by a verification element within the trusted code zone of the device.

15. The system of claim 14, wherein the one or more hardware processors further comprise the encryption element within a trusted code zone of the one or more hardware processors.

* * * * *